(12) United States Patent
Nitsch (10) Patent No.: US 12,114,166 B2
(45) Date of Patent: Oct. 8, 2024

(54) METHOD FOR SETTING UP A SUBSCRIPTION PROFILE, METHOD FOR PROVIDING A SUBSCRIPTION PROFILE, SUBSCRIBER IDENTITY MODULE

(71) Applicant: GIESECKE+DEVRIENT MOBILE SECURITY GMBH, Munich (DE)

(72) Inventor: Nils Nitsch, Markt Schwaben (DE)

(73) Assignee: GIESECK+DEVRIENT MOBILE SECURITY GERMANY GMBH, Munich (DE)

( * ) Notice: Subject to any disclaimer, the term of this patent is extended or adjusted under 35 U.S.C. 154(b) by 0 days.

(21) Appl. No.: 17/612,440

(22) PCT Filed: May 19, 2020

(86) PCT No.: PCT/EP2020/025233
§ 371 (c)(1),
(2) Date: Nov. 18, 2021

(87) PCT Pub. No.: WO2020/239255
PCT Pub. Date: Dec. 3, 2020

(65) Prior Publication Data
US 2022/0232387 A1 Jul. 21, 2022

(30) Foreign Application Priority Data
May 24, 2019 (DE) ...................... 10 2019 003 674.3

(51) Int. Cl.
*H04W 12/30* (2021.01)
*H04W 8/18* (2009.01)
(Continued)

(52) U.S. Cl.
CPC .......... *H04W 12/35* (2021.01); *H04W 8/183* (2013.01); *H04W 12/03* (2021.01); *H04W 12/04* (2013.01); *H04W 12/40* (2021.01)

(58) Field of Classification Search
CPC ..... H04W 12/35; H04W 8/183; H04W 12/03; H04W 12/04; H04W 12/40; H04L 9/085
See application file for complete search history.

(56) References Cited

U.S. PATENT DOCUMENTS 8,565,424 B2 * 10/2013 Vishik ................ H04N 21/4532
713/193
10,367,810 B2 7/2019 Li et al.
(Continued)

FOREIGN PATENT DOCUMENTS

DE 102017212994 B3 11/2018
WO 2014108835 A2 7/2014
(Continued)

OTHER PUBLICATIONS

International Search Report and Written Opinion from PCT Application No. PCT/EP2020/025233, Aug. 20, 2020.
(Continued)

*Primary Examiner* — Mazda Sabouri
(74) *Attorney, Agent, or Firm* — Workman Nydegger (57) ABSTRACT

The invention relates to a method for setting up a subscription profile in a subscriber identity module, preferably an embedded UICC, wherein the following method steps take place in the subscriber identity module: receiving a subscription profile encrypted with a cryptographic key of a subscription server, wherein the cryptographic key for decrypting the subscription profile is unknown to the subscriber identity module at the time of receiving; storing the encrypted subscription profile without decrypting the subscription profile; receiving the cryptographic key at a time after the storing step; decrypting the encrypted subscription profile with the cryptographic key; and installing the decrypted subscription profile to set up the subscription profile in the subscriber identity module. The invention also
(Continued)

relates to a corresponding method in a subscription server, a subscriber identity module, and a computer program product.

16 Claims, 6 Drawing Sheets

(51) Int. Cl.
*H04W 12/03* (2021.01)
*H04W 12/04* (2021.01)
*H04W 12/40* (2021.01)

(56) References Cited

U.S. PATENT DOCUMENTS

| | | | |
|---|---|---|---|
| 2014/0237255 A1* | 8/2014 | Martin | G06F 21/64 713/182 |
| 2016/0241537 A1* | 8/2016 | Cha | H04L 63/20 |
| 2016/0269386 A1 | 9/2016 | Nix | |
| 2017/0155507 A1 | 6/2017 | Park et al. | |
| 2018/0351945 A1 | 12/2018 | Li et al. | |

FOREIGN PATENT DOCUMENTS

| | | |
|---|---|---|
| WO | 2015085058 A1 | 6/2015 |
| WO | 2019050325 A1 | 3/2019 |

OTHER PUBLICATIONS

German Office Action from corresponding DE Application No. 102019003674.3, Oct. 16, 2019.
"Embedded SIM Remote Provisioning Architecture," GSM Association, Version 1.1, Dec. 17, 2013, pp. 1-84.
"Remote Provisioning Architecture for Embedded UICC Technical Specification," GSM Association, Version 2.0, Oct. 13, 2014, pp. 1-293.
"RSP Technical Specification," GSM Association, Version 2.1, Feb. 27, 2017, pp. 1-247.

* cited by examiner

METHOD FOR SETTING UP A SUBSCRIPTION PROFILE, METHOD FOR PROVIDING A SUBSCRIPTION PROFILE, SUBSCRIBER IDENTITY MODULE

TECHNICAL FIELD OF THE INVENTION

The invention relates to a method for setting up a subscription profile in a subscriber identity module, preferably an embedded UICC, and a method for providing a subscription profile to a subscriber identity module, preferably an eUICC, by means of a subscription server, preferably an SM-DP, a corresponding one of the subscriber identity module and a computer program product.

For the use of services of a communication network, a terminal device, for example a cell phone or a machine-to-machine module, in short M2M module, contains a subscriber identity module. The subscriber identity module contains at least one subscription profile, hereinafter also referred to in simplified form as a profile. The profile comprises subscriber identity data to identify and authenticate a subscriber on the communication network, for example a mobile network. This profile makes it possible for an operator of the communications network to uniquely assign the use of a service offered, for example a voice and/or data service, to each subscriber in the communications network. Furthermore, it is possible for the operator to enable network access, that is, logging into the communications network, as soon as the subscriber has been authenticated. It can also deny network access if authentication of the subscriber is not possible.

TECHNICAL BACKGROUND

Today's subscriber identity modules are set up to receive, set up, use, update, activate, deactivate, delete, and/or extend a profile even after it has been established. This is commonly referred to as subscriber identity management, or subscription management. A subscriber identity module can have several different profiles.

Changes to a profile require the providing of a complete profile. In the case of conventional plug-in SIM cards, the profile change could simply be made by replacing the SIM card in the terminal device. Alternatively, a new profile is set up in the subscriber identity module, which is especially done for subscriber identity modules that cannot be easily replaced in the terminal device. When setting up a profile in an eUICC, a profile file structure is created in the subscriber identity module and profile data is loaded into and installed in this profile file structure in a downstream step.

In US 2017/0155507 A1 and US 2016/0269386 A1, methods for installing a profile in an eUICC are proposed. In this process, a profile, encrypted with a first key, is stored on the network side. When the profile installation for the eUICC starts, the encrypted profile and an encrypted first key are sent to the eUICC. The encrypted profiles are decrypting by the first key and installed in the eUICC.

WO 2019/050325 A1 describes a communication scheme and system for convergence of a 5G communication system to support a higher data transmission rate according to the 4G system and IoT technology, providing methods and devices for supporting a profile transfer between terminal devices and methods and devices for supporting easy use of a communication product.

Figure 1:
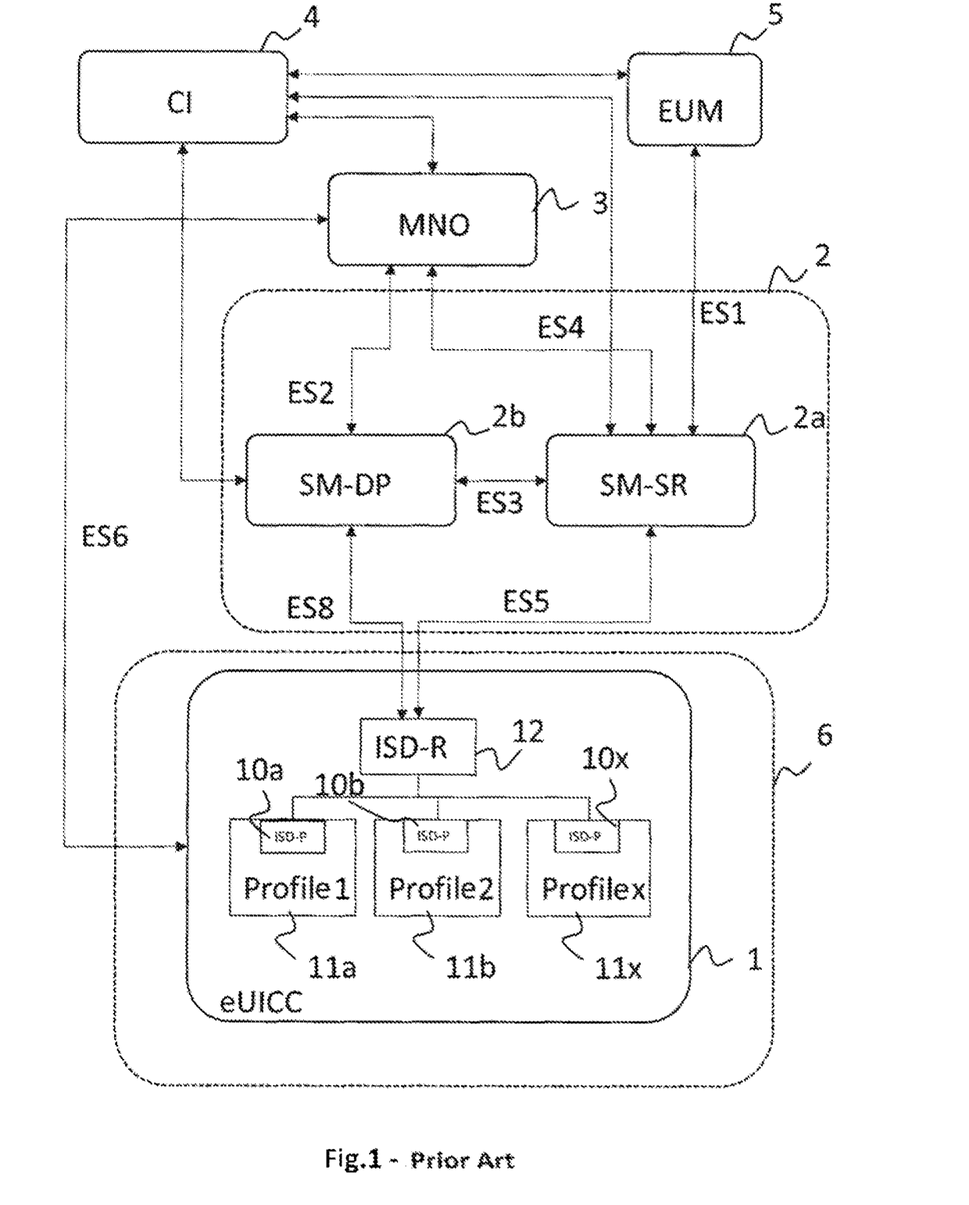
FIG. 1 shows an exemplary performing of a system for managing subscriber profiles according to the GSMA specification [1] to [3]

The GSMA technical specifications "12FAST.13—Embedded SIM Remote Provisioning Architecture 17 Dec. 2013"—hereinafter referred to as technical specification [1]—; "SGP02-Remote-Provisioning-Architecture-for-Embedded-UICC-Technical-Specification V2.0, 13 Oct. 2014"—hereinafter referred to as technical specification [2]—and "SGP.22—RSP" dated Feb. 27, 2017—hereinafter referred to as technical specification [3]—describe such subscription management. The technical specification [1] describes the tasks and functions by means of which a profile is loaded from a subscription server into an eUICC and installed there. The technical specification [2] describes the protocol procedure for downloading and installing a subscription profile in an eUICC. The technical specification [3] provides a technical description of the eUICC architecture, its interfaces and the security functions, especially when used in a customer terminal device. FIG. 1 shows a simplified system for managing profiles or subscriber identity modules in accordance with the technical specifications [1] to [3].

In the GSMA technical specification [1], setting up and installing profiles on a subscriber identity module is explained in more detail in section 3.1.2 starting on page 35. Here, a three-part procedure "Profile download and Installation" is used to download the profile in order to insert and install a new profile on a subscriber identity module. In the first part of this procedure (section 3.1.1 "ISD-P Creation") a new file structure (ISD-P) is created in the eUICC, see also FIG. 10 of the specification [1]. In the second part of this procedure (section 3.1.2 "Key Establishment with Scenario #3-Mutual Authentication") a cryptographic key is exchanged from the subscription server, SM-DP, for the eUICC, see also FIG. 11 of the specification [1] with cryptographic key "ES8.keyEstablishISDPkeyset" to establish a secure channel. Signatures are also used in this process. In the following part 3 of the procedure (section 3.1.3 "download and Installation of the profile"), the profile data of the new profile is sent over the cryptographically secured channel. The eUICC unwraps ("unwrap-pings") the data to equip the new profile with the sent profile data (hereafter referred to as installing). Thus, the new profile is transmitted in the context of a cryptographically secured channel. If an error occurs in any of the three parts of the procedure, the procedure is aborted and the file structure is promptly deleted (see Section 3.1.4 "Error Management Sub-Routine"). The delivery of the profile is thus strictly coupled in time with the installation (i.e. the actual setting up).

In the technical specification [3], section 2.5 describes the profile safeguarding for the delivery of the profile. According to Section 2.5.3 of the technical specification [3], the profile can be protected using cryptographic session keys S-ENC and S-MAC (SCP03, SCP03t-based), see also "Protected Profile Packaging". According to section 2.5.4 of the specification, the profile is also bound to a special eUICC by a key agreement. For this purpose, a subscription server is equipped with, among other things, a "CERT.XXauth.ECDSA" certificate and a "SK.XXauth.ECDSA" private key part of a cryptographic key. A subscriber identity module is equipped with, among other things, a "CERT.EUICC.ECDSA" certificate and a "SK.EUICC.ECDSA" private key part. To provide the profile, according to section 3.1.3 and FIG. 11 of the technical specification [3], the profile metadata is created and a signature "smdpSignature2" is created over it using a part subscriber identity module signature "euiccSignature1". Metadata and the created signature are sent to the subscriber identity module where this signature "smdpSig-nature2" is verified according to section 3.1.3.2 to confirm correct inserting (Download Confirmation). During the immediately following installation of the profile, the metadata is stored. By means of the "ES8+ReplaceSession-Keys" function, the session keys S-ENC and S-MAC can be replaced by new session keys PPK-ENC and PPK-CMAC, see section 3.1.3.3 and FIG. 14 of the technical specification [3]. In doing so, the profiles remain bound to these eUICC. Very strict time management is also specified here, see "Timeout" scenarios between the individual steps and the "Period of Time" in which a profile is to be installed after inserting, see section 3.1.5 of the specification [3]. The installing of the profile is thus very strictly coupled in terms of time with the inserting (Download).

For example, activating a profile, deactivating a profile, deleting a profile, creating a profile, switching from a first profile to a second profile, and/or updating an existing profile is required at the time when the subscriber identity module is already delivered to a subscriber and a profile is used to benefit from services of a communication network. In addition, at a time after the subscriber identity module has been delivered/produced, the subscriber may wish to use additional services of the communications network or another communications network. Such operations cannot be prepared during personalization when subscriber identity modules are manufactured.

However, it is now desirable to have a solution for inserting subscription profiles at a time independent of the actual installing and setting up of the profile in the subscriber identity module. For example, inserting should be done when the subscriber identity module is delivered (to an intermediary or head of family or administrator of corporate eUICC), and the actual setting up should be done much later, for example when the contract is signed. The profile should be inserted into the subscriber identity module at an early stage, while setting up (installing) should be possible much later (possibly weeks, months or even years later). In addition, it should also be possible to delegate a profile setting up to a trusted entity, so that the time of setting up is not determined exclusively by a subscription server. The method shall nevertheless remain secure against manipulation and attacks.

SUMMARY OF THE INVENTION

The invention is based on the task of creating methods and modules in which the setting up of a subscription profile is completely decoupled in terms of time from providing or inserting the profile in the subscriber identity module.

According to the invention, a method for setting up a subscription profile in a subscriber identity module, preferably an embedded UICC, is proposed. Thereby, the following method steps are performed in the subscriber identity module: Receiving a subscription profile encrypted with a cryptographic key of a subscription server, wherein the cryptographic key for decrypting the subscription profile is unknown to the subscriber identity module at the time of receiving, i.e. that the subscriber identity module does not have the cryptographic key for decrypting subscription profile at the time of receiving; storing the encrypted subscription profile without decrypting the subscription profile; receiving the cryptographic key at a time after the storing step; decrypting the encrypted subscription profile with the cryptographic key; and installing the decrypted subscription profile to set up the subscription profile in the subscriber identity module.

A subscriber identity module according to the invention is an electronic module reduced in size and resources, comprising a microcontroller and at least one data interface for communication with the terminal device. This subscriber identity module has a secure memory area in which subscriber identity data is securely inserted in order to prevent attempts at manipulation and/or misuse during identification and/or authentication on the network. The subscriber identity module is operable by means of a terminal device, the module being self-sufficient except for supply signals such as supply voltage, clock, reset, etc.

The subscriber identity module is, for example, a smart card, also known as a Universal Integrated Circuit Card, or UICC, or SIM card. The subscriber identity module is used to identify a subscriber in a communications network with the machine-readable subscriber identity data stored in the secure memory area and to authenticate the subscriber for the use of services.

Alternatively, the subscriber identity module is an integral component within the terminal device, for example as a hard-wired electronic device. Such subscriber identity modules are also referred to as embedded UICC (eUICC). In this design, these subscriber identity modules are not intended to be removed from the terminal device and cannot, in principle, be easily replaced. Such subscriber identity modules can also be designed as embedded secure elements, i.e., as a secure hardware component in the terminal device.

Alternatively, the subscriber identity module can be a machine-to-machine (M2M) module. These modules are used for remote monitoring, control and maintenance of terminal devices such as machines, plants and systems. Alternatively, they can also be used for metering units such as electricity meters, hot water meters, etc.

Alternatively, the subscriber identity module is formed as a software component in a trusted part of an operating system, a so-called Trusted Execution Environment, or TEE, of the terminal device. The subscriber identity module is then formed, for example, within a secure runtime environment in the form of programs running therein, so-called "trustlets".

Subscriber identity data in the sense of the invention is, for example, data that uniquely identifies a subscriber in the communications network. This includes, for example, a subscriber identifier, also known as International Mobile Subscriber Identity, or IMSI and/or subscriber-specific data. The IMSI is the unique subscriber identity file used in a mobile communications network. It consists of the MCC (Mobile Country Code), the MNC (Mobile Network Code) and a sequential number assigned by the network operator.

In addition, subscriber identity data is, for example, data that uniquely authenticates a subscriber to the communications network, such as an authentication algorithm, specific algorithm parameters, a cryptographic authentication key Ki, and/or a cryptographic over-the-air, OTA for short, key.

A communication network in the sense of the invention is a technical facility on which the transmission of signals takes place with identification and/or authentication of the subscriber, whereby services are offered. The communication network is preferably a mobile network. Device-to-device communication under supervision of the communication network is also conceivable. In particular, a mobile communications network is understood here to be, for example, the "Global System for Mobile Communications", GSM for short, as a representative of the second generation, or the "General Packet Radio Service", GPRS for short, or "Universal Mobile Telecommunications System", UNITS for short, as a representative of the third generation, the "Long Term Evolution", LTE for short, as a representative of the fourth generation as a mobile communications network, or a 5th generation mobile communications network with the current working title "5G" as a communications network.

A service is in particular a voice service or a data service with which information and/or data is transmitted via the communication network.

A subscription server is a component that is part of or in communication with the communication network to manage subscriber identity modules, for example to create ("create profile"), set up ("profile download and installation"), enable ("enable profile"), disable ("disable profile") and/or delete ("delete profile") different profiles. The subscription server is divided, for example, into server components, for example a Subscription Managing Secure Routing Server, SM-SR and a Subscription Managing Data Preparation, SM-DP, whereby the method according to the invention is preferably carried out with an SM-DP. The communication between subscription server and eUICC is preferably performed over a secure channel, for example SCP80 and SCP81, as defined in ETSI 102 225 and/or ETSI 102 226.

The subscriber identity module according to the invention does not necessarily have to have an activated profile. However, the subscriber identity module could also already have other different profiles.

An established profile in a subscriber identity module has its own file structure with profile data (installed) therein. This profile data enables the establishment, operation and termination of a connection of the terminal device in the communication network. In particular, the profile data of a profile is data that can uniquely identify and authenticate a subscriber to the communication network, for example, an authentication algorithm, specific algorithm parameters, a cryptographic authentication key Ki, a cryptographic over-the-air (OTA) key, a subscriber identifier, IMSI; a subscriber identity module identifier, ICCID. The profile data may also be applications uniquely associated with that profile, for example, an authentication application, a signing application, or an encryption application. The profile data also has, for example, at least one directory file (DF) and at least one elementary file (EF). This DF and EF may house the authentication algorithm, specific algorithm parameters, the Ki, the OTA key, the IMSI, the ICCID.

Receiving (=inserting) is preferably done (albeit in encrypted form) according to technical specifications [1], [2] and [3]. In this process, a file structure of a new profile is preferably created. The profile data of the profile is preferably transmitted in encrypted form. Decrypting and setting up the profile data are temporally decoupled from receiving.

The profile is encrypted using a cryptographic key that is unknown to the subscriber identity module. Thus, the cryptographic key is not one of the keys described in the technical specifications [1] to [3], for example, negotiated as a session key to establish a secure channel or negotiated as part of Protected Profile Packaging based on the signatures of the server and eUICC.

For example, the cryptographic key used to encrypt the profile is a secret used for encrypting. The secret is unknown to the eUICC. The secret is transmitted as a key in the form of a record at the time after storing to the eUICC. This cryptographic key is thereby, for example, a token that is transferable to the eUICC, for example, a software token.

According to the invention, the profile data is not decrypted at the time before setting up (installing) and cannot be used by the subscriber identity module for its intended use, i.e., establishing, operating and terminating a connection of the terminal device in the communications network. Instead, the profile data is stored in encrypted form in the file structure (ISD-P) of the profile. Because of the encryption and the absence of the corresponding cryptographic key, none of the profile data can be used by the subscriber identity module.

The encrypted profile, in particular the encrypted profile data, is stored in a memory area of the subscriber identity module. Even after the storing step, the profile is encrypted, and in particular the profile data is not decrypted, unfolded, or installed.

At a time after storing, the cryptographic key is received that can be used to decrypt the encrypted profile. The time period between key receiving and storing is indefinite. The period can be weeks, months, or even years. Thus, a subscriber identity module may be storing (inserting, downloading) a profile and setting it up (unpacking and installing) at a significantly later time. The storing can be confirmed with from the eUICC.

Preferably, the encrypted subscription profile is sent from a subscription server and received in the eUICC. The profile can then be provided in the context of a subscription administration according to the technical specification [1] to [3], using the procedures "create profile" and "download profile", but with the modification that the profile to be downloaded is encrypted and cannot be decrypted and thus unwrapped ("unwrap") and set up ("install") in the immediate aftermath of receiving the profile. Additional protection of the transport—by establishing a secured channel or by binding the profile to a specific eUICC in the context of "profile package bounding" is to be distinguished from encrypting the profile according to the invention and can also be (additionally) applied here.

Alternatively, the encrypted subscription profile is received from a publisher of the subscriber identity module. This is then preferably done during manufacturing as part of a personalization process.

Finally, the cryptographic key is received. In particular, the key is information that allows the encrypted profile to be decrypted. For example, an asymmetric key pair (PM infrastructure) or a symmetric key pair is used. For example, the cryptographic key is a software token that is received as a record in the subscriber identity module.

The key is used for decrypting the profile. Finally, the profile is unpacked in the subscriber identity module and also installed. The installing according to the invention is preferably done according to the technical specification [1] to [3]. From this time, which can be any arbitrary one after storing, parts of the profile, for example the file structure with profile data therein, can be accessed by means of the subscriber identity module. The arbitrary time is, for example, the time of a contract conclusion of the subscription, which now no longer has to coincide with the providing/inserting of the profile, i.e. the time is decoupled from the inserting of the profile.

Preferably, the key in the subscriber identity module is received from a subscription server. Thus, the key was not sent to any other instance of the system as shown in FIG. 1 and could not be stolen. The time of receiving the key may have occurred depending on an activate command of a system instance according to FIG. 1.

Alternatively or additionally, the key is sent to a trusted entity, such as a second subscriber identity module. Thus, decrypting can be delegated to another instance (the owner/operator of the second subscriber identity module). This instance can be used, for example, to define a specific affiliation (family, company) or hierarchical dependency. Unpacking and installing a profile can then be done, for example, when a new employee is hired to issue a company phone, the (first) subscriber identity module may have already stored the profile in encrypted form regardless of the hiring period.

Alternatively or additionally, the key has two parts (key part is here synonymous with the use of two different keys), where only the combination of both parts (forming the key) decrypts the encrypted stored profile. For example, the profile could be encrypted twice with different keys, where a first key remains in the subscription server and is sent from there to the subscriber identity module. A second key is delivered to a trusted entity, such as a second subscriber identity module. Only both key parts (key 1 and key 2) allow decrypting of the profile. Security is thus further enhanced. Alternatively, a logical calculation rule (AND, OR, EXCLUSIVE-OR) from the first key part and the second key part forms the cryptographic key.

After decrypting and installing, the profile is fully set up on the subscriber identity module. The subscriber identity module sends a confirmation to the subscription server that the profile is now fully set up. It is then subsequently preferred to be the activated profile.

The subscription server is thereby a remote manager of the subscriber identity module, in particular as defined in technical specifications [1] to [3].

In another aspect of the invention, a method is provided for providing subscription profiles for a subscriber identity module, preferably an eUICC, by means of a subscription server, preferably an SM-DP. In the subscription server, the following process steps are performed: creating a subscription profile for a subscriber identity module; encrypting the created subscription profile with a cryptographic key that is initially unknown to the subscriber identity module; providing the encrypted subscription profile for inserting the encrypted subscription profile into the subscriber identity module; sending a cryptographic key or first key part suitable for decrypting the subscription profile at a time after sending the encrypted subscription profile; and receiving confirmation from the subscriber identity module that the second subscription profile has been decrypted and set up.

Preferably, the inserting is done by the subscription server or a publisher of the subscriber identity module.

Preferably, the sending of the cryptographic key or the first key part is done from the subscription server directly to the subscriber identity module.

Preferably, sending the cryptographic key from the subscription server directly to a second subscriber identity module, wherein the second subscriber identity module sends the cryptographic key to the subscriber identity module for decrypting the subscription profile.

Further preferably, sending the first key part from the subscription server further comprises sending the first key part from the subscription server directly to the subscriber identity module; and sending a second key part from the subscription server directly to a second subscriber identity module, wherein the cryptographic key for decrypting the encrypted profile is formed from the first key part and the second key part.

The method steps preferably comprise a creating function and/or an enable function and/or a disable function according to technical specifications [1] to [3].

Sending a confirmation from the subscriber identity module that the profile is set up indicates to the subscription server that the profile can now be used. This confirmation is made, for example, as part of a "download complete" confirmation in accordance with GSMA specifications [1] to [3] by the eUICC.

This confirmation is followed, for example, by the sending of a profile activation command from the subscription server to the subscriber identity module to activate the subscription profile that has been set up. This can also deactivate a previously active profile in the subscriber identity module. Switching between two profiles would thus be achieved.

Decrypting is additionally accompanied by unpacking.

In another aspect, a subscriber identity module is provided comprising an encrypted subscription profile stored in the subscriber identity module. The module comprises a decryption function arranged to decrypt the encrypted subscription profile after receiving a cryptographic key, the cryptographic key being stored temporally later in the subscriber identity module. Furthermore, an installation function is provided for installing the decrypted subscription profile in the subscriber identity module, thereby setting up the subscription profile in the subscriber identity module.

Preferably, the decryption function and the installation function are implemented by a functionality of the operating system OS of the subscriber identity module—or alternatively implemented by an applet which is set to start after receiving the cryptographic key.

Preferably, a key-image function is provided in the subscriber identity module to form a cryptographic key from two key parts (one part from the subscription server and one part from the second subscriber identity module). The key-forming function is implemented by an applet that is set up to start after receiving both of the key parts.

Preferably, the subscriber identity module comprises a data storage for storing the subscription profiles, an interface arranged for communication with the subscription server, preferably via a terminal device comprising the subscriber identity module, and an interface arranged for communication with a network server. In addition, means arranged to perform the method described above are provided.

A terminal device in the sense of the invention is in principle a device or device component that has means for communicating with the communications network in order to be able to use services of the communications network. For example, a mobile terminal device such as a smart phone, a tablet PC, a notebook, a PDA can be included under the term. The term terminal device may also include, for example, multimedia terminal devices such as digital picture frames, audio devices, television sets, e-book readers, which also have means for communicating with the communications network. For example, the term terminal device also comprises any kind of machines, automats, vehicles, devices which have means, in particular cellular modems, for communicating with the communication network.

In a further aspect, a subscription server, preferably an SM-DP, is provided arranged for providing up the subscription profile to a subscriber identity module, preferably an eUICC, wherein the subscription server implements the method described above by an encryption function.

The subscription server further comprises an interface arranged to communicate with the subscriber identity module, preferably via a terminal device comprising the subscriber identity module; an interface arranged to communicate with a network server; and means arranged to perform the above method.

In addition, there is provided a computer program product executably installed in a subscriber identity module and comprising means for performing the method steps of any of the preceding methods. Preferably, the computer program product is a Java Card applet inserted into the eUICC for performing the procedural steps.

A function is an executable program code installed in the subscriber identity module that can be made to perform by a command corresponding to the function being sent to the subscriber identity module. A function may be part of an applet on the subscriber identity module. Multiple functions may be called sequentially by an applet.

Thus, according to the invention, a subscriber identity module is created in which the inserting is temporally decoupled from the setting up of the subscription profiles in the subscriber identity module.

For example, communication takes place via SMS, HTTPS or TCP sessions.

Activating/deactivating a profile is done, for example, by means of a proactive command (REFRESH) sent by the eUICC to the terminal device to restart the eUICC.

BRIEF DESCRIPTION OF THE FIGURES

In the following, the invention or further embodiments and advantages of the invention are explained in more detail with reference to figures, whereby the figures only describe embodiments of the invention. Identical components in the figures are given the same reference signs. The figures are not to be regarded as true to scale, and individual elements of the figures may be shown in exaggeratedly large or exaggeratedly simplified form.

DETAILED DESCRIPTION OF EMBODIMENT EXAMPLES

FIG. 1 shows an exemplary performing of a system for managing subscriber profiles 11a, 11b, 11x according to the above mentioned GSMA specification [1], [2] and [3].

According to FIG. 1, an eUICC 1 is remotely administered by the server 2. In this case, the eUICC 1 is installed in a terminal device 6 in a fixed or removable manner. An eUICC 1 of the system in FIG. 1 has a security domain (=SD) with different privileges and configurations for managing the subscriber profiles 11a, 11b, 11x, such as an ISD-R 12, which is managed by a server component 2a (=Subscription Manager Secure Routing, SM-SR for short). An eUICC-controlled security domain, ECASD, can also be included, which is managed by a certificate issuer 4 (=in English, Certificate Issuer, CI) on the eUICC 1. A file structure of a profile 11a, 11b, 11x is managed by the server component 2b (=data preparation, in English, the Subscription Manager Data Preparation, SM-DP). FIG. 1 shows three profiles 11a, 11b, 11x, each of which has a file structure 10 (=ISD-P) and whose profile data within the file structure 10 is managed and saved by the server 2.

The number of profiles 11a, 11b, 11x that the eUICC 1 may include is not limited to three and may be more or less.

In FIG. 1, the SM-SR 2a and the SM-DP 2b are shown as separate server components of the server 2, but they are hereinafter considered as one server 2.

Only one ISD-R 12 is provided per eUICC 1. The ISD-R 12 can be installed and personalized for the first time by an eUICC manufacturer 5 (=eUICC manufacturer, EUM) during the manufacture of the eUICC 1. After manufacture of the eUICC 1, the ISD-R 12 is in the life cycle state PERSONALIZED. The ISD-R 12 can then perform part management functions on each ISD-Ps 10.

One file structure 10a, 10b, 10x (ISD-P) is provided for each profile 11a, 11b, 11x. Only one file structure 10a (ISD-P) is enabled on an eUICC 1 at the time. A file structure 10a (ISD-P) is installed by the ISD-R 12 and then personalized with the server 2. At least one file structure 10a (ISD-P) with a profile 11a, 11b, 11x may be installed and first personalized by the EUM 5 during the fabrication of eUICC 1 to enable future eUICC connectivity.

Except for the ISD-R 12, no component outside the ISD-P 10 has visibility or access to any profile component of profiles 11a, 11b, 11x. The ISD-R 12 has read access to connection parameters of the individual profiles 11a, 11b, 11x. No profile component is visible or accessible from components outside the respective profile. According to the invention, the ISD-R 12 enables profile data of a first profile to be accessed for installing a second profile.

Figure 2:
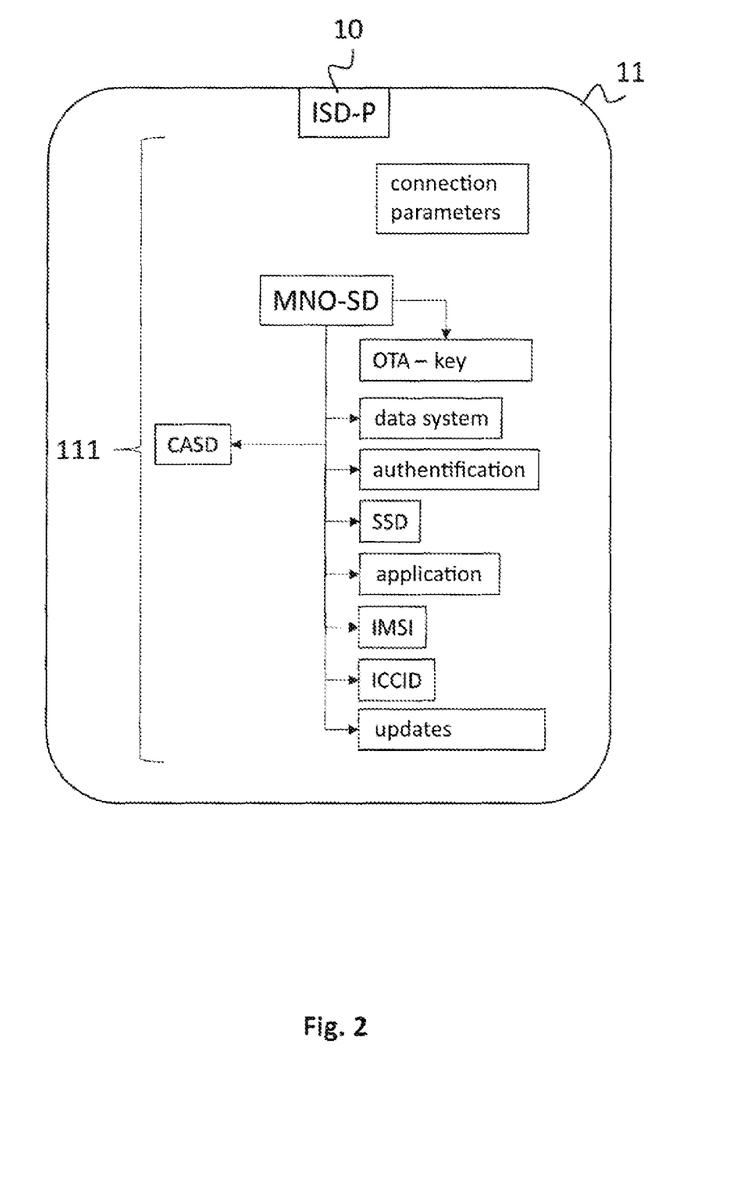
FIG. 2 shows a structure of a profile for use.

A file structure 10 remains associated with the ISD-R 12 throughout its lifetime to enable the ISD-R 12 to perform the following subscriber management functions: Profile creation—the association between the ISD-R 12 and a file structure 10 can be created at any time; profile deletion; profile activation; profile deactivation; fallback position setting; and profile transport function. The structure of profiles 11a, 11b, 11x is shown in FIG. 2.

In FIG. 1, a plurality of interfaces ESx of the system are provided:

An interface ES8 addresses functions to the eUICC 1 via a secure channel established between the SM-DP 2b and the file structure 10 of a profile 11. To enable this in a secure manner, the profile 11 is personalized with at least one set of keys. The ES8 interface is implemented by a secure channel, which is established by a secure channel between the SM-DP 2b and the SM-SR 2a (=ES3 interface), and can be further tunneled by a secure channel SCP80 or SCP81 between the SM-SR 2a and the ISD-R 12. The communication is then passed from the ISD-R 12 to the respective profile 11.

The interface ES6 addresses functions to the eUICC 1 over a secure channel set up between a mobile network operator (Mobile network Operator, MNO) 3 and an MNO security domain included in each ISD-P 10. The eUICC 1 supports ports SCP80 and SCP81 as defined in ETSI 102 225 and ETSI 102 226 for this E6 interface. The initial OTA key sets are part of each profile 11a, 11b, 11x and are loaded by the SM-DP 2b during a profile download and installation process or loaded by the EUM 5 before eUICC 1 is issued.

The ES5 interface addresses functions to the eUICC 1 via a secure channel established between the SM-SR 2a and the ISD-R 12. The eUICC 1 supports SCP80 and SCP81, as defined in ETSI 102 225 and ETSI 102 226, for this E5 interface. To enable SCP80/SCP81, the ISD-R 12 is personalized with appropriate key sets by the EUM 5 prior to issuance. The key sets are loaded into the ISD-R 12 via the SM-SR 2a; e.g., using interface ESI.

In the system of FIG. 1, the OTA communication is handled exclusively by the SM-SR 2a. For example, the SM-SR 2a uses SMS, CAT TP, or HTTPS for over-the-air, OTA, communication with the eUICC 1. When using HTTPS, the SM-SR 2a and eUICC 1 support domain name resolution to resolve an IP address of the SM-SR 2a. In long term evolution networks, the system of FIG. 1 also supports short message service (SMS). The SM-SR 2a is free to choose the transmission protocol according to the capabilities of the eUICC 1, the terminal device 6 and the performing server 2. The eUICC 1 supports the sending of secure data packets via SMS according to 3GPP TS 31.115.

According to the technical specification [1], chapter 3.3.1.2.2 "Profile Download and Installation Function", a "Download" function is used to load a profile into an eUICC 1. In addition to "Download", however, further accompanying functions must be performed. According to the technical specification [1], chap. 3.3.1.3.1 "ISD-P Creation Function" and the technical specification [2], chap. 3.1.1 "ISD-P Creation", "Create" functions are required to create a file structure 10, in particular the ISD-P, in the eUICC 1.

According to the technical specification [2], chap. 3.1.3 "Download an Installation of the Profile", after the ISD-P has been created, a profile is downloaded and stored in the file structure, in particular the ISD-P. According to the technical specification [1], chapter 3.3.1.2.3 "Profile Content Update Function" and chapter 3.3.1.2.4 "Policy Rules Update Function", "Update" functions are applied to perform updates according to the newly downloaded profile. According to the technical specification [1], chapter 3.3.1.3.4 "Profile Enabling Function" and the technical specification [2], chapter 3.2 "Profile Enabling", "Enable" functions are performed to enable a downloaded profile, in particular an ISD-P, and thereby make it usable for the user of the eUICC 1.

FIG. 2 shows a profile file structure 10 of a profile 11 according to FIG. 1. The profile 11 is controlled by the file structure 10 as described above. The file structure 10 has profile data. For example, one of the following may be included as profile data in the file structure 10: an MNO security domain (MNO-SD) including the OTA key sets of the MNO; at least one authentication parameter (Ki), a network access application, policy rules, a file system including folders (DF) and elementary files (EF); connection parameters of the profile, applications; a subscriber identifier, IMSI, a subscriber identity module identifier ICCID, profile updates.

Figure 3:
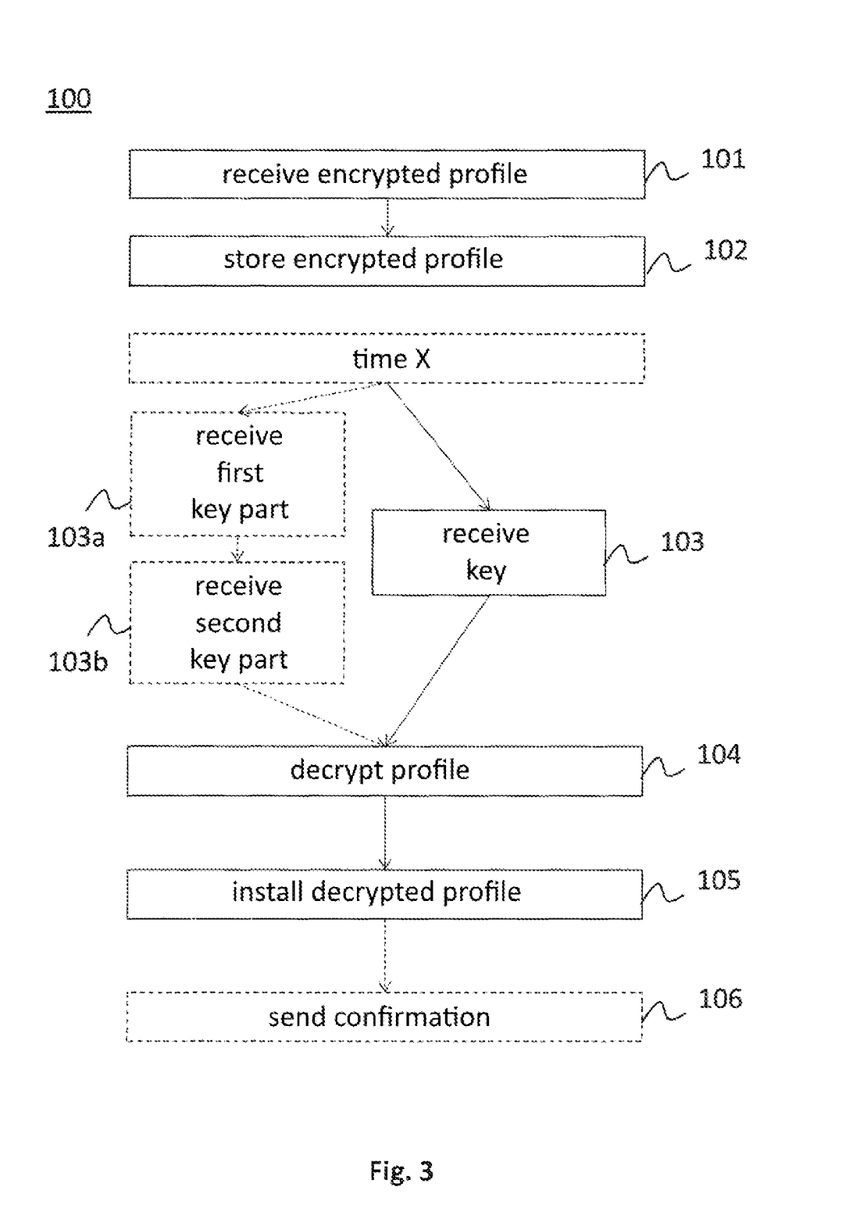
FIG. 3 shows an example embodiment of a flowchart of a method according to the invention in a subscriber identity module.

FIG. 3 shows an embodiment example of a flowchart of a method 100 according to the invention in a subscriber identity module, hereinafter referred to as eUICC 1.

In step 101, an encrypted profile is received in the eUICC 1. This profile is stored in step 102. Thereafter, the subscriber identity module 1 is delivered and/or operated with a different profile, for example.

At any time X, a key is received in the eUICC 1 at step 103. Alternatively—represented by steps 103a and 103b—the eUICC 1 receives two key parts (or two different keys). In step 104, the profile is decrypted using the key received in step 103. Step 104 may also include forming a key from the key parts received in steps 103a and 103b. Then, the decrypting profile 11 is installed in step 105. Finally, successful decrypting is—optionally—confirmed in step 106.

FIG. 3 does not show that, in addition to decrypting according to the invention, the establishment of a secure channel, for example via the interfaces ES5, ES8, is also provided. Furthermore, profile package bounding, i.e., unambiguous assignment of a profile to a specific eUICC 1 by means of session keys using signatures and certificates of the server 2 and the eUICC 1, is also provided. These additional encryptions are to be separated from the encryption/decryption according to the invention, as they have to comply with a strict temporal sequence to allow a successful insertion of a profile according to the technical specifications [1] to [3].

Figure 4:
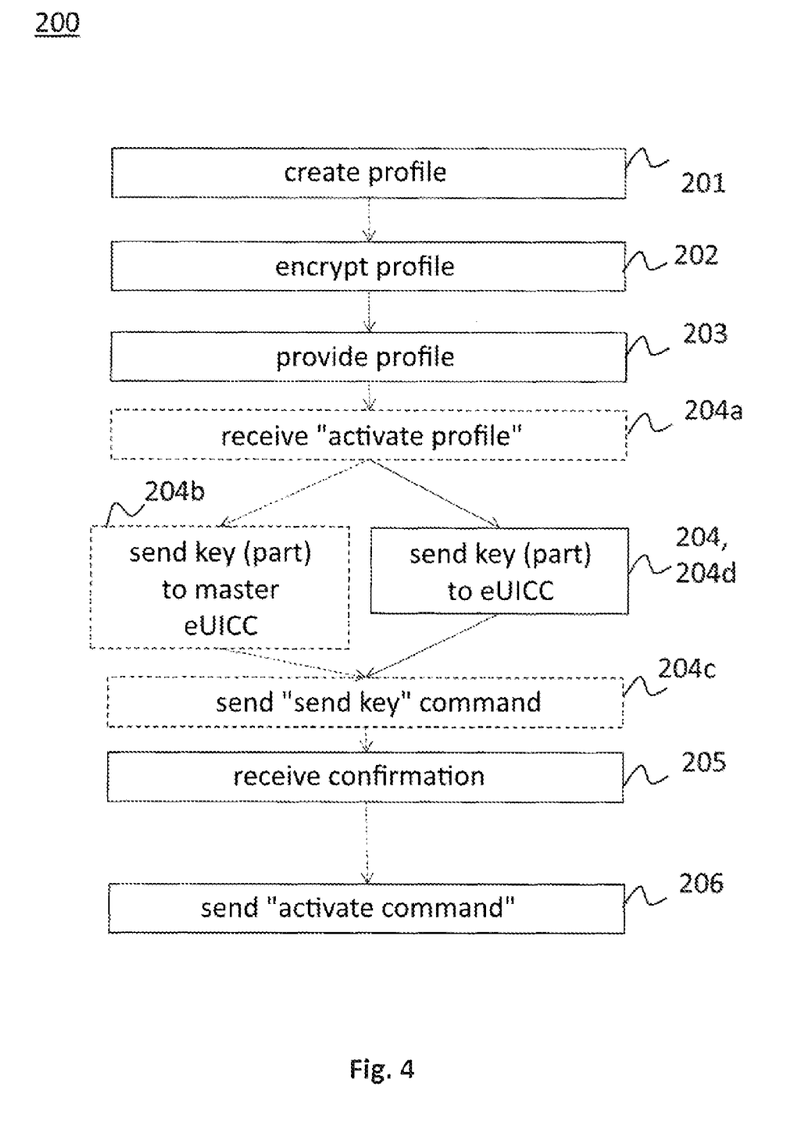
FIG. 4 shows an embodiment example of a flowchart of a method according to the invention in a subscription server.

FIG. 4 shows an embodiment example of a flowchart of a method 200 according to the invention in a subscription server 2. The server 2 creates a profile in step 201. In step 201, the created profile is encrypted. In step 203, the encrypted profile is provided. This is done, for example, directly from the server 2 to the eUICC 1 or indirectly via a publisher EUM 5 of the eUICC 1.

Optionally, the server 2 receives a profile activation step, for example in the context of a contract conclusion. In step 204, the key required for decrypting the profile 11 is sent to the eUICC 1. This is, for example, a software token transmitted as a record. Alternatively, in step 204b, a key is sent to a master eUICC 7. In step 204b, only a key part may also be sent to the master eUICC 7, for which purpose a key part different from the key part sent to the master eUICC 7 is also sent to the eUICC 1 in step 204d.

In optional step 204c, a send key command is sent from the server 2 to the master eUICC 7.

This is followed by decrypting and setting up the profile in the eUICC 1, whereby it is set up. In step 205, the server 2 receives a confirmation from the eUICC 1 that the profile is set up. In step 206, the server 2 sends an activate command to the eUICC 1 to activate the profile.

Figure 5:
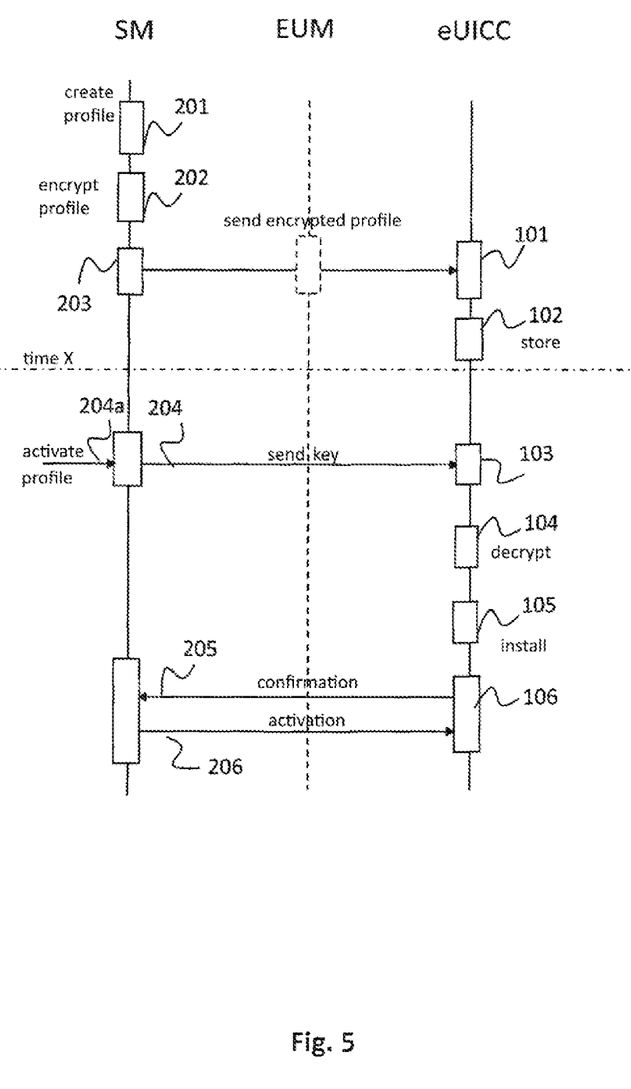
FIG. 5 shows an example of a flowchart of a method according to the invention between a subscriber identity module and a subscription server.

FIG. 5 shows an example of an embodiment of a flowchart of a method according to the invention between a subscriber identity module 1 and a subscription server 2. FIG. 5 combines the two methods 100 and 200 from the previously described FIGS. 3 and 4, so there is no need to repeat what was previously shown.

The starting point of the invention is the creating of a profile 11 in the server 2, preferably in the SM-DP 2b. In step 202, the profile is encrypted. In step 203, the encrypted profile is sent to the eUICC via an interface ES5. Alternatively, in step 203, the encrypted profile is sent from the server 2 (SM-DP 2b) to the publisher 5 via interfaces ES3 and ES1. As a result, the eUICC 1 receives the encrypted profile via interface ES5 or ES8 in step 101. In step 102, the encrypted profile is stored. At a time X, which may be months or years later, the server 2 may receive a activate profile command in optional step 204a. In step 204, a cryptographic key is sent from the server 2 to the eUICC 1, where it is received in step 103. In step 104, the eUICC 1 decrypts the stored encrypted profile and installs it in step 105. The profile is considered fully set up after step 105. In step 106, the eUICC 1 sends a corresponding confirmation to the server 205, which in turn then activates the set-up profile in step 206.

The activation of the profile may be indicated to an MNO server 3 by the server 2. During the activation of the profile, a REFRESH proactive command may be sent to a terminal device 6 to restart the eUICC 1.

Figure 6:
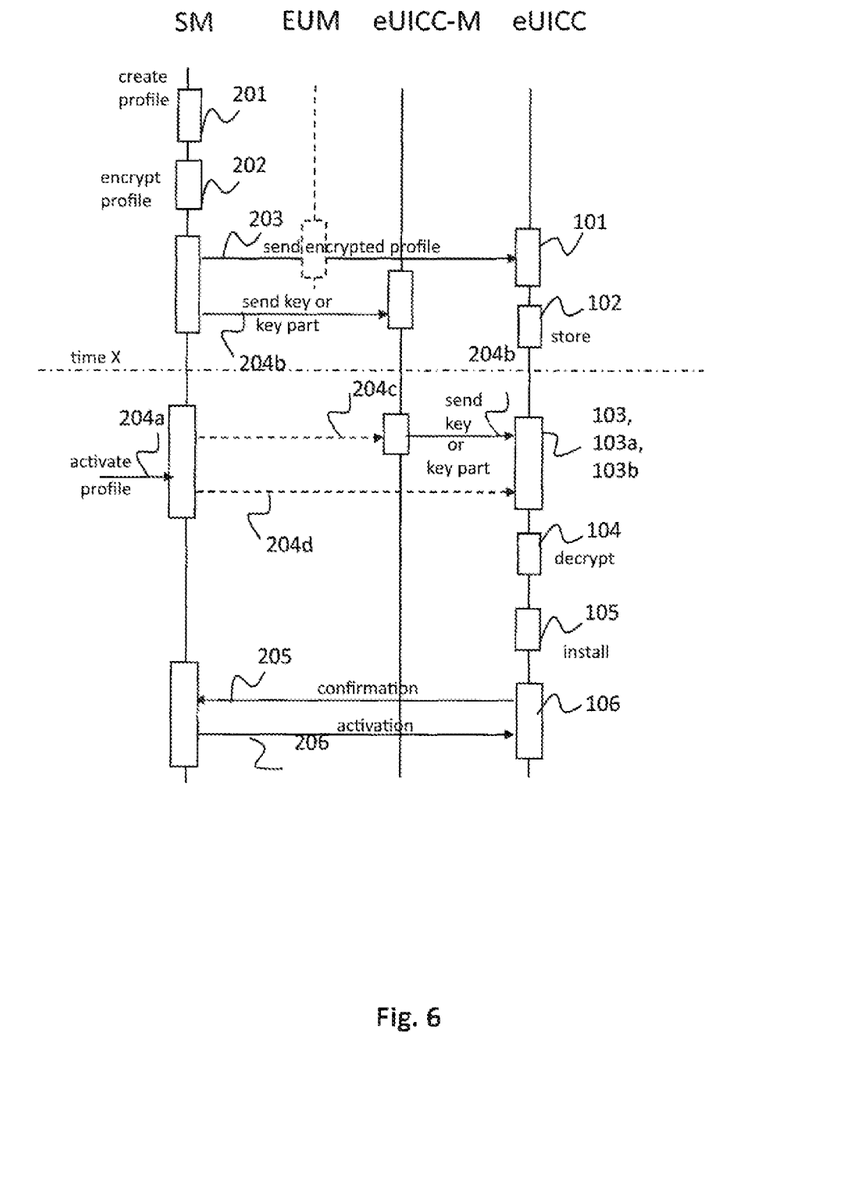
FIG. 6 shows an embodiment example, extended to FIG. 5, of a flowchart of a method according to the invention between a subscriber identity module and a subscription server.

FIG. 6 shows an embodiment example extended to FIG. 5 of a flowchart of a method according to the invention between a subscriber identity module 1 and a subscription server 2. FIG. 6 likewise combines the two methods 100 and 200 from the previously described FIGS. 3 and 4. A repetition of what was previously shown can thus be dispensed with; only the differences from FIG. 5 are described.

In step 204b, the cryptographic key is transmitted from the server 2 to a master eUICC 7. This master eUICC 7 is a trusted entity. For example, the master eUICC 7 is a second eUICC 7 in the method. For example, an affiliation may be defined between the eUICC 1 and the master eUICC 1, such as a family or company affiliation, with which the encrypted profile of the eUICC 1 is decrypted by the key of the eUICC 7. This allows the decrypting of the profile of the eUICC 1 to be delegated to another trusted entity. In step 204*b*, only one key part can also be transferred. A second key part then remains in the server 2 and is not transferred to the eUICC 1 in step 204*d* until profile activation 204*a*, i.e., after time x. The transmission of the key part of the master eUICC 7 can be initialized by a step 204*c*, so that the master eUICC 7 sends the second key part to the eUICC 1 after the step 203*c*. By means of both key parts transmitted according to step 204*b* and 204*d*, a cryptographic key can be formed in the eUICC 1 with which the profile can be decrypted. Instead of different key parts, two different keys may be used to decrypt the profile. The cryptographic key can be a private key of a PM infrastructure. The cryptographic key may be a symmetric key. In particular, the cryptographic key is a secret without which the profile cannot be decrypted.

The subsequent steps 104 to 106 and 205 correspond to the steps of FIG. 5.

The time X may be months or years after the storing step 102, which may decouple the inserting of a profile in time from the setting up of the profile. Delivery of the eUICC 1 is thus no longer linked to setting up the profile, delivery infrastructure can thus be greatly simplified.

Within the scope of the invention, all elements described and/or drawn and/or claimed can be combined with each other in any way.

The invention claimed is:

1. A method for setting up a subscription profile in a subscriber identity module, wherein the following method steps take place in the subscriber identity module:
    receiving a subscription profile encrypted with a cryptographic key of a subscription server,
    wherein the cryptographic key for decrypting the subscription profile is unknown to the subscriber identity module at the time of receiving;
    storing the encrypted subscription profile without decrypting the subscription profile;
    receiving the cryptographic key at a time after the storing step;
    decrypting the encrypted subscription profile with the cryptographic key; and
    installing the decrypted subscription profile to set up the subscription profile in the subscriber identity module;
    wherein decrypting the encrypted subscription profile and installing the decrypted subscription profile are decoupled in time from receiving the cryptographic key;
    wherein decrypting the encrypted subscription profile and installing the decrypted subscription profile is coordinated to occur in context of a contract conclusion.

2. The method according to claim 1, wherein the encrypted subscription profile is received from a subscription server.

3. The method according to claim 1, wherein the encrypted subscription profile is received from a publisher of the subscriber identity module.

4. The method according to claim 1, wherein the cryptographic key for decrypting the encrypted subscription profile is received from a subscription server at a time after the storing step.

5. The method according to claim 1, wherein the cryptographic key for decrypting the encrypted subscription profile is received from a second subscriber identity module at a time after the storing step.

6. The method according to claim 1, wherein the cryptographic key for decrypting the encrypted subscription profile in the subscriber identity module is obtained from a first part received from a second subscriber identity module at a time after the storing step and a second part received from a subscription server at a time after the storing step in the subscriber identity module.

7. A method for providing subscription profiles for a subscriber identity module by means of a subscription server, wherein in the subscription server the following method steps take place:
    creating a subscription profile for a subscriber identity module;
    encrypting the created subscription profile with a cryptographic key unknown to the subscriber identity module;
    providing the encrypted subscription profile for inserting the encrypted subscription profile into the subscriber identity module;
    sending a cryptographic key or a first key part suitable for decrypting the subscription profile at a time after providing the encrypted subscription profile; and
    receiving a confirmation from the subscriber identity module that the subscription profile has been decrypted and installed;
    wherein the subscription profile is decrypted and installed at a time decoupled in time from sending the cryptographic key or the first key part;
    wherein decrypting the encrypted subscription profile and installing the decrypted subscription profile is coordinated to occur in context of a contract conclusion.

8. The method according to claim 7, wherein the inserting is from the subscription server or a publisher of the subscriber identity module.

9. The method according to claim 7, wherein the sending of the cryptographic key or the first key part is from the subscription server directly to the subscriber identity module; or
    wherein the sending of the cryptographic key from the subscription server occurs directly to a second subscriber identity module, the second subscriber identity module sending the cryptographic key to the subscriber identity module for decrypting the subscription profile.

10. The method according to claim 7, wherein sending the first key part from the subscription server further comprises:
    sending the first key part from the subscription server directly to the subscriber identity module;
    sending a second key part from the subscription server directly to a second subscriber identity module,
    wherein the cryptographic key for decrypting the encrypted profile is formed from the first key part and the second key part.

11. The method according to claim 1, wherein the method steps comprise a creating function and/or an enable function and/or a disable function according to the technical specification SGP02-Remote-Provisioning-Architecture-for-Embedded-UICC, version 2.0.

12. A subscriber identity module comprising an encrypted subscription profile stored in the subscriber identity module with:
    a decryption function adapted to decrypt an encrypted subscription profile after receiving a cryptographic key; and an installation function arranged to install the decrypted subscription profile in the subscriber identity module, thereby setting up the subscription profile in the subscriber identity module;

wherein the decryption function and the installation function are configured to be decoupled in time from receiving the cryptographic key;

wherein decrypting the encrypted subscription profile and installing the decrypted subscription profile is coordinated to occur in context of a contract conclusion.

13. The subscriber identity module according to claim 12, wherein the decryption function and the installation function are realized by a functionality of an operating system of the subscriber identity module or by an applet, wherein the functionality of the operating system or the applet is arranged to start after receiving the cryptographic key or key part.

14. The subscriber identity module according to claim 12, further comprising:

a data storage for storing the subscription profiles, an interface arranged for communication with the subscription server, preferably via a terminal device comprising the subscriber identity module, an interface arranged for communication with a network server; and means arranged to perform the method according to for setting up a subscription profile in a subscriber identity module, preferably an embedded UICC, wherein the following method steps take place in the subscriber identity module:

receiving a subscription profile encrypted with a cryptographic key of a subscription server, wherein the cryptographic key for decrypting the subscription profile is unknown to the subscriber identity module at the time of receiving;

storing the encrypted subscription profile without decrypting the subscription profile;

receiving the cryptographic key at a time after the storing step;

decrypting the encrypted subscription profile with the cryptographic key; and installing the decrypted subscription profile to set up the subscription profile in the subscriber identity module;

wherein decrypting the encrypted subscription profile and installing the decrypted subscription profile is coordinated to occur in context of a contract conclusion.

15. A non-transitory computer readable storage medium comprising a computer program product executably installed in a subscriber identity module and comprising means for performing the method steps of claim 1.

16. The method according to claim 1, wherein decrypting the encrypted subscription profile and installing the decrypted subscription profile is initiated by an external command.

* * * * *